July 18, 1939.   L. BUDNICK   2,166,621
ELECTRIC WIRING CONNECTION
Filed April 7, 1938
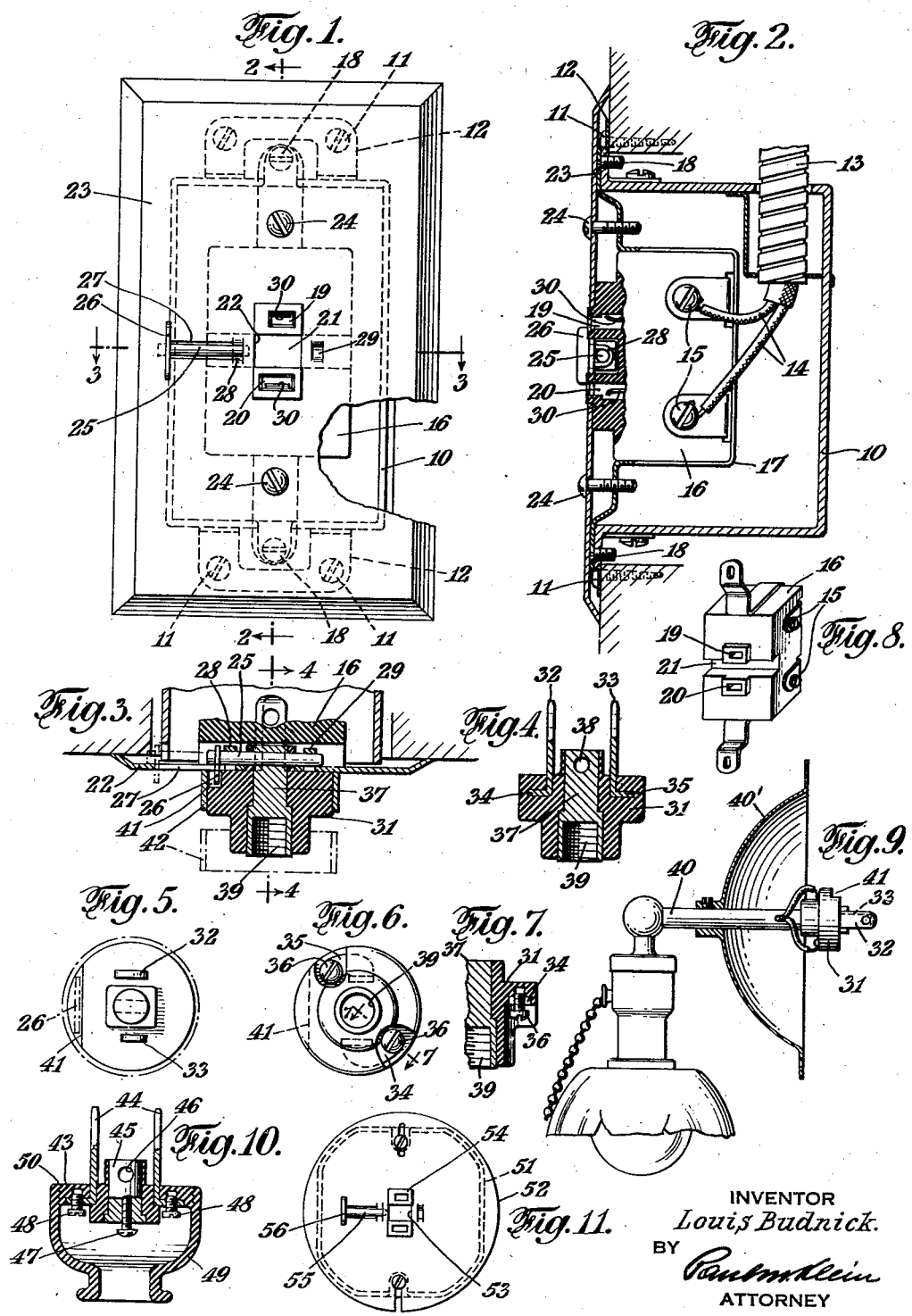
INVENTOR
*Louis Budnick.*
BY
ATTORNEY Patented July 18, 1939

2,166,621

UNITED STATES PATENT OFFICE 2,166,621

ELECTRIC WIRING CONNECTION

Louis Budnick, New York, N. Y., assignor to Sadye Budnick, New York, N. Y.

Application April 7, 1938, Serial No. 200,621

4 Claims. (Cl. 173—330)

This invention relates to electric wiring connections in general, and especially to connections between electric outlet boxes and electric fixtures or the like.

The heretofore followed procedure of connecting electric fixtures to outlet boxes consisted of securing an outlet box to the wall, floor or ceiling, either during the erection of a structure or after its erection, and leaving the wires or leads, connected with the outlet box, to project for a sufficient length until the electrician is ready to secure the fixtures to the outlets. The fixtures, such as wall lamps or the like, are wired in the shop and are delivered with their electric leads extending for a sufficient length to permit their joining and soldering with the leads extending from the outlet boxes.

In order to support the weight of the fixtures, the outlet boxes were usually provided with what is known as "hickeys", which form the connectors between the outlet box and the fixture to be attached. There are different types of hickeys, most of them being provided with threaded extensions, one of which extensions being connected to the outlet box, while the other serves as connecting means for a fixture. After the fixtures are attached by means of these hickeys to the outlet box, the ends of the leads from the outlet box and from the fixtures are connected, soldered, insulated, and forced into the outlet box, whereupon the fixture body is placed over the outlet box to conceal it.

When it is desired to remove the fixture from the wall or ceiling, it is necessary to break the soldered wire connection before the fixture can be unscrewed. It very often occurs that the threaded connections provided in the hickey become loose and that it is necessary to tighten the fixture, in which case the soldered wire connections have to be twisted about the hickey one full turn, which is not only bothersome, but also dangerous to the wire connections. In most cases when the fixture is connected by way of a hickey, it is usually not grounded, in consequence of which the operation of the fixture becomes dangerous. When, for instance, a light is turned on the person turning the switch receives an electric shock.

The present invention has for its objects to provide safe and secure electric wiring and mechanical connections between an outlet box and a fixture, or the like, which will facilitate the pre-wiring, without the employment of soldered wires, of both the outlet box and of the fixture which is to be attached thereto, and by which connections the fixture is also positively grounded so as to preclude any possibility of an electric shock when the fixture is operated.

Another important object of the present invention is to eliminate the use of hickeys and to facilitate the complete pre-wiring of fixtures in the shop, and to render them ready for almost instantaneous attachment to, or detachment from, pre-wired electric outlet boxes.

The foregoing and still further objects and important advantages of the present invention will become more readily understood from the ensuing description, in connection with the accompanying drawing, the latter although forming an essential part of my disclosure, being by no means intended to limit my invention to the specific illustrations, and in which:

Fig. 1 is a plan view of an electric outlet box provided with a plug receptacle and grounded plug locking means, in accordance with my invention.

Fig. 2 is a cross-sectional view therethrough, taken on lines 2—2 of Fig. 1.

Fig. 3 is another cross-sectional view, taken on lines 3—3 of Fig. 2.

Fig. 4 is a cross-sectional view through a plug, forming a part of my device, taken on lines 4—4 of Fig. 3.

Fig. 5 is a plan view of a plug with its prongs directed upwards.

Fig. 6 is another plan view of the plug seen from the end to which a fixture is intended to be attached.

Fig. 7 is a cross-sectional view taken on lines 7—7 of Fig. 6.

Fig. 8 is a perspective detailed view of one of the many possible forms of a plug receptacle which may be used in an outlet box.

Fig. 9 illustrates a pre-wired electric fixture provided with my plug.

Fig. 10 is a cross-sectional view through a modified construction of my plug, and Fig. 11 illustrates another type of an outlet box equipped in accordance with my invention.

Referring now specifically to Figures 1, 2 and 3, I have illustrated an outlet box 10, extending into the wall of a structure, and attached by means of screws 11 and end lugs 12 in the usual way. Extending into the box is an armored cable 13, from which project electric leads 14 which are removably attached by means of screws 15 to plug receptacle 16. The latter is securely held by means of a yoke 17 in the desired position within box 10, the yoke ends being held in place by screws 15 passing through suitable extension lips of box 10.

Plug receptacle 16 is preferably made of dielectric material and is provided with two differently shaped or differently sized prong receiving recesses 19 and 20, as clearly seen from Figs. 1 and 8. Between these recesses the receptacle body is provided with a deep channel 21, the purpose of which will be explained presently. The portions of the receptacle body surrounding recesses 19 and 20 are preferably somewhat raised so as to project through an aperture 22, stamped out at approximately the center of cover plate 23 to provide access to the plug receptacle.

Plate 23 is shown secured by means of screws 24 to yoke 17, and preferably covers the wall opening and box 10. While I have shown a solid, oblong covering plate, it is not absolutely necessary that a plate be used, or that the box opening be covered; any other instrumentality which is strong enough and is securely connected with the box will answer the purpose, but it must be of a sufficiently sturdy construction to withstand the strain for which it is intended, as will be presently apparent.

In about the center portion of plate 23 and above channel 21 of the plug receptacle, there is slidably mounted a tapered bolt 25 which is adapted to operate between plug recesses 19 and 20 and to span the width of aperture 22 when in locking position. Bolt 25 operates at the underface of plates 23 but is actuated from the upper face of the plate by means of a handle 26 which is so constructed, as to engage the edges of slot 27 provided in the plate for operating bolt 25. The bolt is held against sidewise movement by guide loops 28 and 29, located at both side edges of aperture 22. These loops are preferably pressed out from the plate material.

In prong receiving recesses 19 and 20 of the plug receptacle there are provided the usual contact springs 30 for resiliently engaging the prongs of a plug. In Figs. 3, 4, 5, 6 and 7 I have illustrated one of the preferred forms of my attachable plug, consisting of a dielectric body 31, into which are molded and from which extend terminals or prongs 32 and 33. The latter are preferably of different design or shape, such as is clearly indicated in Fig. 5, one of the prongs being broader or wider than the other. The different shape or size of the prongs is intended to prevent the inadvertent placement of the wrong prong into the wrong prong recess for the reason that it is desirable to connect the so-called "hot" or "live" lead to the hot or live wire, whereas the other wire, called "grounded", should be connected to the grounded lead. The embedded portions 34 and 35 of the prongs form electric connections between the prongs and wire attaching screws 36, which latter are mounted at the face of the plug opposite to that from which the prongs project. These screws serve for detachably connecting thereto wire leads from fixtures or devices adapted to be connected with the plug.

Arranged at the center of the plug and passing entirely through its body is a metallic element 37, one end of which extends between the prongs and is provided with a through passage 38, adapted to be lockingly engaged by bolt 25 mounted in the plate. The portion of metallic element 37 extending between the prongs is securely insulated from the prongs, the entire length of the element being completely covered by insulating material. The opposite end of element 37 is recessed and threaded at 39 and is adapted to accommodate the threaded end of an electric fixture, such as shown at 40 in Fig. 9.

At the prong face of plug 31 there is provided a recess 41 for accommodating handle 26 of bolt 25 when the latter is in its locking position in respect to plug element 37. In order to prevent the inadvertent outward or unlocking movement of pin or bolt 25, I provide a locking ring 42 shown in Fig. 3 which is readily slipped over the body of the plug and covers recess 41 in which handle 26 reposes.

In Fig. 3 plug 31 is shown in engagement with plug receptacle 16, in which position it is held by bolt 25 passing through apertures 38 of element 37. Due to the tapered shape of bolt 25 the engagement between the plug and plate 22 is gradually increased as the bolt passes on its way through element 37 into engagement with loop 29 of the plate. In this manner a positive and very rigid connection is provided between the plug and the plate.

In Fig. 10 I have illustrated another type of a plug, intended for use in connection with radios or similar devices, required to be "grounded". This plug consists of a dielectric plug body 43 from which again extend terminals or prong 44. At the plug center is provided an electro-conductive element 45, equipped with a locking instrumentality in the form of aperture 46 at one of its ends, while at the other end is a wire attaching screw 47 for facilitating the grounding of a device connected to the plug. Prongs 44 are provided with suitable embedded extensions having wire attaching screws 48. The wire connections of the plug are covered by a suitable cap 49 which is preferably screwed to the plug body at 50.

In Fig. 11 I have illustrated another type of an outlet box 51 provided with a cover 52, the latter having again a central opening 53 to provide access to and to accommodate a prong receptacle 54 mounted within the box. A plug locking bolt 55 with a suitable actuating handle 56 is slidably associated with the cover.

*Operation*

From the foregoing description, the essential structural features of my invention are apparent. The practical application of my device is extremely simple and exceptionally time-saving, as will be presently evident. It also provides much safer and more desirable electric and mechanical connections between an electric fixture and an electric outlet, as compared with heretofore used similar devices.

When an outlet box is secured in the wall, the leads from cable 13, instead of being permitted to remain unattended until the fixture is attached, are safely fastened by means of attaching screws 15 to plug receptacle 16, whereupon the outlet is covered by plate 23 or its equivalent. Thus the outlet is rendered absolutely safe.

The fixture is pre-wired in the shop, plug 31 is securely fastened to the fixture and the leads of the fixture are thereupon attached to the plug by means of screws 36. The latter, although shown in the drawing to be located at the face opposite to that from which the prongs extend, may be disposed at any other suitable location so as to readily facilitate the attachment of the leads to the plug.

Now the electrician brings all the pre-wired fixtures to the already pre-wired, closed outlet box, and the only thing which is necessary for him to do is to insert the plug of each fixture into the respective plug receptacle, move bolt 25 into locking position and slip ring 42 over handle 26. Finally, the cover 40' of the fixture is moved over the outlet box and the entire work is finished.

The employment of my device saves unnecessary labor and especially that of providing soldered connections between the outlet box and the fixture to be attached. It also obviates the danger of short circuiting the wire leads, by tightening the connection between the outlet box and the fixture, as is often necessary in the heretofore employed methods and when using hickeys. Since I eliminate the use of hickeys, and provide a positive connection between the fixture and the plug in the shop, and since my locking bolt positively and securely attaches the plug, and therefore the fixture, to the outlet box, there is no occasion for retightening the fixture once it is attached. An important advantage of my construction resides in the fact that the fixture, through element 37 of the plug and through bolt 24 and plate 22 is positively grounded, which from the standpoint of safety is especially advantageous.

As quickly as a fixture may be attached to an outlet it may be just as easily detached therefrom, without disturbing the wiring of either the outlet box or of the fixture. This is particularly advantageous when the electrician is to change fixtures or when the fixtures require repairs which are easier made in the shop than at the premises with which the fixtures are decorated. In order to detach the fixtures, the body of cover 40' of the fixture is moved away from the wall, whereby plug 31 is exposed. Thereupon bolt 25 is moved to its unlocking position so as to free the plug. Now the plug is removed from the outlet and thereby the fixture is freed. There are no wires to be cut or unsoldered and the outlet remains as safe after the removal of the fixture as it was while the fixture was attached.

While the foregoing description deals with specific forms of my invention, it is quite obvious that changes and improvements may become necessary in the manufacture and due to the employment of my device to various uses, and I therefore reserve for myself the right to make such changes and improvements therein, without departing from the broad scope of my invention, as defined in the annexed claims.

I claim:

1. In an electric wiring connection, the combination with a grounded, wirable receptacle having a grounded cover, of a terminal member, having differently shaped terminals, removably associable with said covered receptacle, the latter being provided with terminal receiving means, corresponding in shape to that of the terminals, said terminal member having a locking instrumentality, adapted to be grounded, and at least two wire attaching means, electrically connected with the terminals, a grounded, movable locking bolt operatively mounted with the cover of the receptacle and adapted to engage the locking instrumentality of said terminal member so that the latter becomes forcibly and immovably united with the receptacle cover, and so that said locking instrumentality becomes securely grounded.

2. The combination with an outlet box having a plug receptacle, of grounded cover means associated with the box, a plug removably associated with the receptacle, a groundable locking element forming the center of said plug, slidable, grounded locking cover means operatively secured to said grounded means of the box and adapted to interlock with said element, the latter being provided with means for attaching and grounding an object to be secured to said plug.

3. In an electric wiring connection, the combination with a grounded, wirable receptacle, of a terminal member adapted to be removably associable with the latter and provided with a plurality of terminals and a lockable instrumentality, disposed centrally in respect to, and being insulated from said terminals and adapted to be grounded; grounded, manually, operable locking means mounted with said receptacle and adapted to forcibly engage and ground said lockable instrumentality of the terminal member, thereby drawing said member into positive, immovable union with said receptacle.

4. In a device for removably securing an electric fixture or the like to an electric outlet without the requirement of making or breaking wire connections, a dielectric terminal plug having prongs, an electro-conductive element transversing the plug but being electrically insulated from said prongs, both ends of the element being constructed and arranged for making electro-conductive, grounding connections between the outlet and such electric fixture or the like, one end of the element having means for facilitating its firm attachment, against forcible, disengagement, to the outlet, its other end having means for securely and bodily connecting thereto an electric fixture or the like.

LOUIS BUDNICK.